Aug. 4, 1953 R. B. DOME 2,647,992

FREQUENCY STABILIZED RADIO RECEIVING SYSTEM

Filed Dec. 3, 1948

Inventor:
Robert B. Dome,
by Morton D. Morse
His Attorney.

Patented Aug. 4, 1953

2,647,992

UNITED STATES PATENT OFFICE 2,647,992

FREQUENCY STABILIZED RADIO RECEIVING SYSTEM

Robert B. Dome, Geddes Township, Onondaga County, N. Y., assignor to General Electric Company, a corporation of New York Application December 3, 1948, Serial No. 63,292

4 Claims. (Cl. 250—20)

Figure 1:
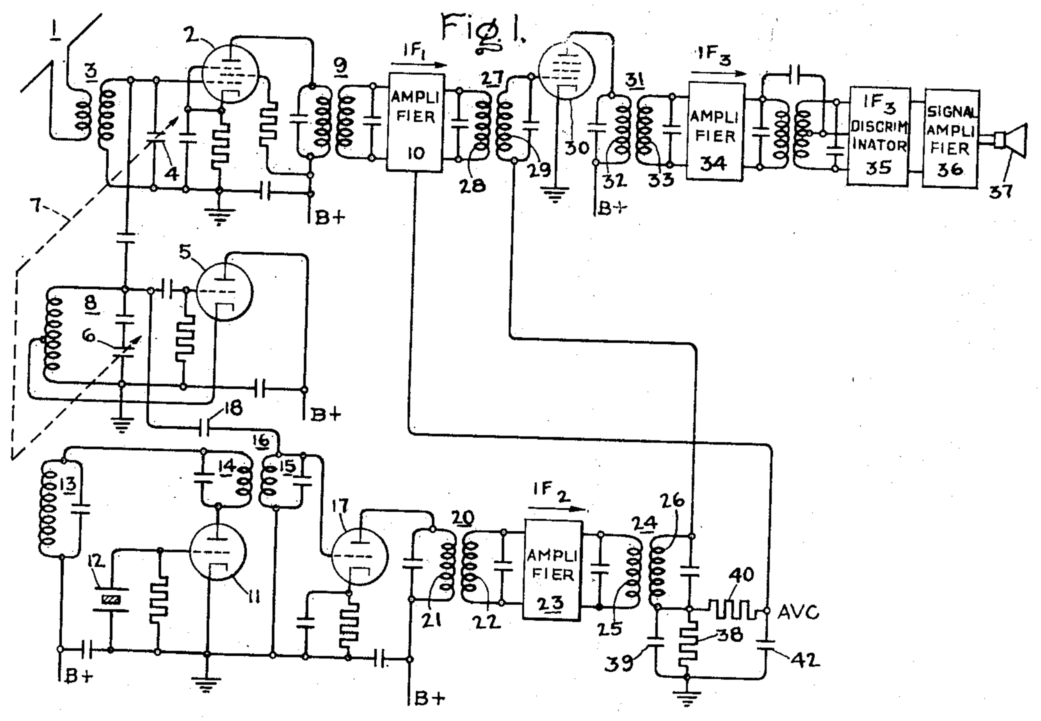

This invention relates to radio receivers generally and more particularly to a system for stabilizing the operation of superheterodyne receivers employing intermediate frequencies in the process of de-modulating a carrier wave.

My invention finds particular application in frequency modulation receivers, although its applications are not limited thereto. With commercial frequency modulation receivers, it is customary to tune to a carrier wave, containing a signal superimposed as a frequency modulation, through adustment of a local heterodyning oscillator by the operator. Such a receiver normally comprises an intermediate frequency amplifier, a frequency discriminator, and a signal reproducing system, such as an audio amplifier followed by a loudspeaker. The intermediate frequency amplifier is usually designed to provide constant amplification over a band of frequencies centered on the intermediate frequency elected for the purpose, and the discriminator is adjusted to have its crossover point at the intermediate frequency. The crossover point of a balanced frequency discriminator determines the frequency at which the signal output is zero when a carrier voltage of that frequency is applied to it. If the frequency of the voltage applied is shifted either above or below this frequency, an output results of positive or negative polarity, depending upon the direction of the instantaneous frequency shift. If distortionless reception is to be achieved, it is essential that the intermediate frequency coincide with the frequency of the crossover point of the discriminator which shall henceforth be termed the crossover frequency. If the intermediate frequency deviates from the crossover frequency, noise and undesirable interference will be produced in the output and the quality of reception will decrease accordingly.

In the commercial frequency modulation receivers known in the prior art, reception is achieved by tuning the local oscillator to produce an intermediate frequency coinciding with the crossover frequency of the discriminator. This requires accurate tuning on the part of the operator and, in practice, it has been found very difficult to secure. The result has been that the ordinary commercial frequency modulation receiver is seldom accurately tuned and is often far off from the correct tuning point. Even when initially accurately tuned, the oscillator of the receiver is prone to drift in frequency, due to changes in supply voltages and ambient temperature, so that after a lapse of time, the balance point is no longer maintained, that is, the intermediate frequency no longer coincides with the crossover frequency. These difficulties are all the greater when push-button station selection is desired, or when a receiver is operated in a location subject to intense vibration. Push-button station selection normally makes for inaccurate tuning and in the same vein, automobile receivers are subject to considerable vibrations and shocks. These difficulties have precluded the incorporation of push-button station selection in the frequency modulation broadcast band and have made frequency modulation receivers for use in automobiles impractical. In the latter case, mechanical jarring of the oscillator disturbs its frequency enough to throw the receiver off the balance point.

A proposal which has been quite often advanced for overcoming these objections is to employ separate quartz crystals for each frequency modulation signal to be received. Thus, a receiver having six push-buttons for the reception of signals on six different channels would require six high-frequency crystals. This solution is not too attractive, however, because of circuit complications and resulting high cost and has not generally been adopted. The circuit complications result in part from the fact that the crystal oscillators must produce high frequency fundamentals in order to avoid spurious responses, and high frequency crystals, in the order of 50 megacycles, are difficult to manufacture.

An object of my invention is to provide a crystal stabilized receiver employing only one quartz crystal to provide reception over a number of evenly spaced channels throughout a band of frequencies.

A further object of my invention is to provide a frequency modulation receiver having a variable frequency local oscillator and a crystal oscillator to insure the production of an intermediate frequency coinciding with the crossover point of a balanced frequency discriminator whenever a carrier is received in the frequency modulation band.

A further object of my invention is to provide a frequency modulation receiver having two local oscillators, one manually controlled for tuning to a station and the other accurately stabilized for insuring a final intermediate frequency of increased stability and constancy.

Still a further object of my invention is to provide a frequency modulation receiver having a final intermediate frequency stabilized by a crystal oscillator suitable for use with push-button station selection and also suitable for use in a location subject to intense mechanical vibration.

In accordance with my invention, I generate three intermediate frequencies in the receiver, the last of the three being the result of the difference in frequency between the received carrier frequency and a crystal controlled frequency, and accordingly is highly stable, in order to assure distortionless reception through demodulation by a frequency discriminator. The first intermediate frequency may be equal to the difference between the received carrier frequency and frequency of a local oscillator which can be varied for tuning to different carrier waves. The second intermediate frequency may be the difference between the frequency generated by the local oscillator at the tuning point and a predetermined harmonic of a crystal oscillator, these harmonics occurring at intervals equal to the channel spacing throughout the band in which the carriers are located. The third intermediate frequency is equal to the difference between the first and the second intermediate frequencies and accordingly is equal to the difference between the carrier to which the receiver is tuned and the predetermined harmonic. Thus, the frequency of the local oscillator is eliminated from the final intermediate frequency and, since any variations and shifts in frequency occur in the local oscillator, they also are eliminated from the final intermediate frequency.

For further objects and advantages and for a better understanding of the invention, attention is now directed to the following description and accompanying drawings, and also to the appended claims, in which the features of the invention believed to be novel are more particularly pointed out.

Figure 2:
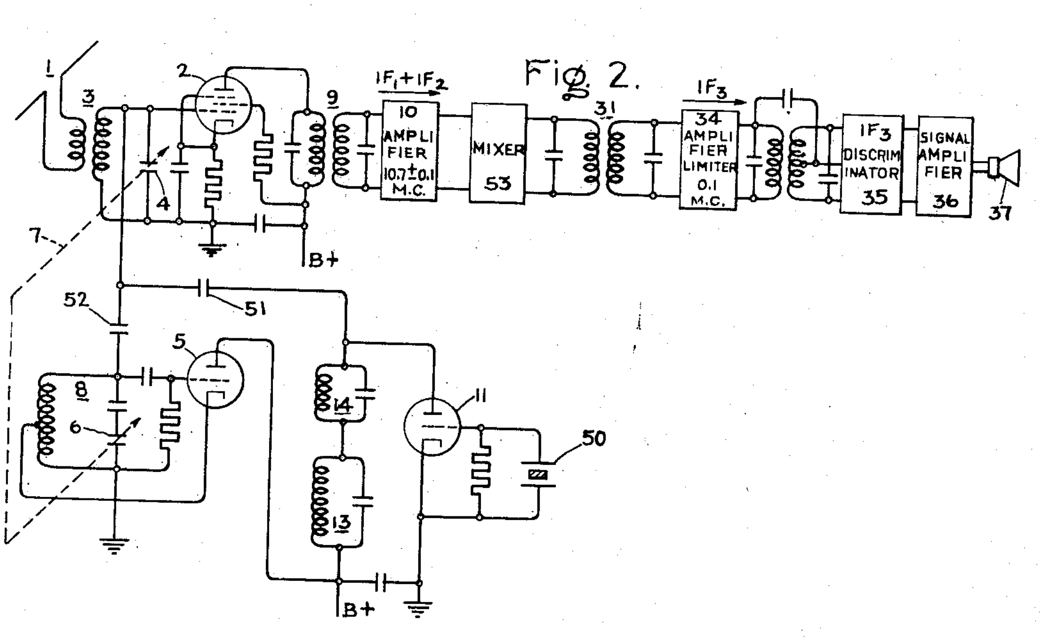

In the drawings, Figs. 1 and 2 are schematic diagrams, partly in block form, of different frequency modulation receivers embodying my invention.

Referring to Fig. 1, there is shown an antenna 1, adapted to intercept incoming frequency modulated carrier waves, which are applied to the control electrode of an electron discharge device 2 operating as a frequency converter, through a transformer 3. Anode operating potential for device 2, and also for the other electron discharge devices in the circuit, is provided from a source (not shown in the drawing) indicated at B+. The secondary winding of transformer 3 is tuned to a carrier frequency by variable capacitor 4. An electron discharge device 5 operates as a local oscillator, and its frequency is controlled by a variable capacitor 6, which is mechanically coupled to capacitor 4, as indicated conventionally by the broken line 7. The tuned circuit 8 of the oscillator is designed so that the difference between the frequency to which the input circuit of the converter is tuned, and the frequency of the local oscillator, is maintained substantially constant throughout the frequency modulation band of 88.1 to 107.9 megacycles per second. This difference frequency is the first intermediate frequency previously mentioned and will henceforth be termed $IF_1$. An output circuit 9 is connected to the anode of device 2, and is tuned to the first intermediate frequency $IF_1$, so that the original carrier frequency and the local oscillator frequency are substantially eliminated, and only intermediate frequency $IF_1$ is transmitted to an intermediate frequency amplifier 10 which may be of conventional design.

An electron discharge device 11 is employed as a crystal oscillator with piezoelectric crystal 12, to generate oscillations of the crystal frequency in a tuned circuit 13 which is adjusted to offer an inductive impedance at the crystal frequency. A tuned circuit 14 is connected between the anode of device 11 and the circuit 13, and forms by juxtaposition with another tuned circuit 15, a radio frequency transformer 16. Transformer 16 is tuned as a band-pass transformer to transmit a band of frequencies approximately 20 megacycles in width, this band being positioned in the frequency spectrum in a region to be specified later.

An electron discharge device 17 is employed as a frequency converter or mixed. Its control electrode is supplied with voltages from two different sources: firstly, from the crystal oscillator through the coupling transformer 16; and secondly, from the local oscillator through a small coupling capacitor 18. The output circuit of device 17 is a transformer 20, comprising a primary circuit 21 and a secondary circuit 22, both of which are tuned to the second intermediate frequency, previously mentioned, which will henceforth be termed $IF_2$, and which is equal to the difference in frequency between the local oscillator output and the particular harmonic of the crystal oscillator selected. The secondary circuit 22 supplies intermediate frequency $IF_2$ to an amplifier 23, which is designed to transmit effectively only that frequency to its output transformer 24, comprising a primary circuit 25 and a secondary circuit 26.

The output of frequency $IF_1$ from intermediate frequency amplifier 10 is supplied to an output transformer 27 comprising a primary circuit 28 and a secondary circuit 29. Secondary circuit 29 is connected in series with secondary circuit 26 which supplies an output of frequency $IF_2$. The voltages in both circuits are added serially and supplied to the control electrode of an electron discharge device 30, connected as a frequency converter or mixer. Thus, both intermediate frequencies $IF_1$ and $IF_2$ are supplied to the control electrode of device 30 and its anode is connected to an output transformer 31, comprising a primary circuit 32 and a secondary circuit 33, both tuned to a third intermediate frequency $IF_3$, which is equal to the difference in frequency between $IF_2$ and $IF_1$. This third intermediate frequency $IF_3$ may be amplified further, if required, by amplifier 34 in which amplitude limiting may be provided for in a conventional manner. The output of amplifier 34 is then fed to a frequency discriminator 35 and demodulated to provide the original modulating signal of the carrier wave. This signal may be amplified by a signal amplifier 36, which, in the case of a commercial frequency modulation receiver, would be an audio amplifier connected to actuate a loudspeaker 37 for translation of the signal into audible sounds.

Rectified voltages proportional to the amplitude of the intermediate frequencies supplied to the control electrode of device 30 may be used for automatic volume control purposes in conventional manner. This is indicated in the circuit by the inclusion of a grid current resistor 38, a shunting capacitor 39, an automatic volume control or AVC filtering resistor 40, and capacitor 42.

The receiver operates as follows: The crystal 12 is selected to have a fundamental frequency of oscillation equal to the spacing in frequency between frequency modulation channels, that is, equal to the frequency spacing between the carrier frequencies allocated to individual broadcast stations in the frequency modulation band. At present, the frequencies allocated by the Federal Communications Commission provide a spacing of 200 kilocycles between channels, and crystal 12 is cut to oscillate at 200 kilocycles per second. If, for example, the incoming carrier wave to be received is near the center of the frequency modulation band at 98.1 megacycles per second, and the first intermediate frequency $IF_1$ is 10.7 megacycles, the local oscillator is tuned to provide an output at 108.8 megacycles so that the frequency difference between 108.8 megacycles and 98.1 megacycles is equal to the first intermediate frequency $IF_1$ of 10.7 megacycles. Next, let it be assumed that the frequency selected for the second intermediate $IF_2$ is 14.6 megacycles. Now device 11, due to the non-linearity of its operation as an oscillator, has harmonics of its fundamental frequency in its anode current. These harmonics occur at frequency intervals equal to the fundamental frequency of the crystal, that is, at intervals of 200 kilocycles. Accordingly, one of these harmonics, which happens in this case to be the 471st, occurs at a frequency of 94.2 megacycles. The local oscillator at a frequency of 108.8 megacycles heterodynes with this particular harmonic of the crystal oscillator to give a frequency equal to their difference, namely, 14.6 megacycles, thus providing the specified second intermediate frequency $IF_2$.

In frequency converter device 30, the first and second intermediate frequencies of 10.7 megacycles and 14.6 megacycles, respectively, are combined and the third intermediate frequency $IF_3$ is formed from their difference. The third intermediate frequency then results at 3.9 megacycles, and amplifier 34 and discriminator 35 are both adjusted to operate at this frequency.

To illustrate the advantages of my invention, assume that the operator does not set the local oscillator precisely to 108.80 megacycles but sets it instead to 108.82 megacycles, or alternatively assume that the local oscillator drifts in frequency from 108.80 to 108.82 megacycles. Then $IF_1$ becomes 10.72 megacycles; $IF_2$, 14.62 megacycles; but $IF_3$ being the difference between $IF_2$ and $IF_1$ remains unchanged at 3.9 megacycles. These relations may be more generally summarized as follows:

Let $CW$=frequency of the carrier wave received
$LO$=frequency of the local oscillator
$XL$=frequency of one of the harmonics of the crystal, occurring at frequency intervals $P$
$P$=intervals between channels over the FM band Then $$IF_1=LO-CW, \quad \text{(I)}$$
$$IF_2=LO-XL, \text{ and} \quad \text{(II)}$$
$$IF_3=IF_2-IF_1. \quad \text{(III)}$$

Substituting the values of $IF_1$ and $IF_2$ from Equations I and II in Equation III:

$$\text{Then, } IF_3=CW-XL \quad \text{(IV)}$$

Thus the third and final intermediate frequency is independent, within certain limits, of the frequency of operation of the local oscillator and is determined solely by the frequency of the carrier wave received and the particular harmonic of the crystal oscillator selected. This provides a worthwhile improvement in receiver operation, because, regardless of minor readjustments of the local oscillator, the frequency discriminator is always supplied with its correct frequency to provide balanced detection and distortionless reception. In fact, a frequency modulation receiver constructed in accordance with my invention tunes in a manner quite similar to an ordinary amplitude modulation broadcast receiver operating in the broadcast band from 540 to 1600 kilocycles. As the tuning control is manipulated, the receiver signal increases and decreases in the familiar manner of amplitude modulation broadcast reception, with an entire absence of the cacophonic reception obtained at present with frequency modulation receivers when they are improperly adjusted at side response points. A tuning indicator, such as those commonly known as a "magic eye," need merely indicate maximum signal at the grid of the converter device 30 in a manner similar to an amplitude modulation receiver tuning indicator. Moreover, it makes possible push-button receivers and automobile receivers for frequency modulation reception, because of the fact that frequency drift problems and microphonics arising from local oscillator frequency instability are largely eliminated.

Another feature of my invention is that the receiver responds only to carriers located in the channels for which the receiver is designed. For instance, in the embodiment which has been described, the receiver will respond only to carriers occurring at every 200 kilocycles throughout the frequency modulation broadcast band of 88.1 to 107.9 megacycles. The receiver cannot respond to undesired signals occurring between the allocated frequencies because the available harmonics of the crystal oscillator occur for those frequencies only and for none other. Thus, as the tuning of the receiver is varied over the band, carriers alternately appear and disappear at every 200 kilocycles with no signal being received in between. This is actually an advantage in commercial receivers for the frequency modulation broadcast band, since the function of the receiver is to permit tuning into the broadcast stations legitimately transmitting in that band and the frequencies of transmission of these stations are spaced to permit reception by this receiver.

Referring to Fig. 2, there is shown a modification of my invention which operates in a manner quite similar to that of Fig. 1, but in which certain measures of economy in the circuit have been achieved by utilizing a single intermediate frequency amplifier channel for transmitting two intermediate frequencies simultaneously. The same reference numbers have been used to denote similar elements throughout Fig. 2 as were used in Fig. 1. Thus, an antenna 1 for intercepting incoming signals is coupled to the control electrode of discharge device 2, operating as a frequency converter through transformer 3, of which the secondary is tuned by a variable capacitor 4 to the incoming carrier wave frequency. An electron discharge device 5, operating as a local oscillator, produces oscillations whose frequency is controlled by variable capacitor 6 mechanically coupled to capacitor 4 through a linkage indicated by the broken line 7. The resonant network 8 and the transformer 3, along with variable capacitors 4 and 6, are designed to maintain a constant difference in frequency between the frequency to which the converter device 2 is tuned, and that generated by oscillating device 5. This results in a first intermediate frequency $IF_1$ at the output of the converter which is coupled through a transformer 9 to the intermediate frequency amplifier 10.

An electron discharge device 11 is connected as a crystal oscillator, its output frequency being determined by the piezoelectric crystal 50, whose fundamental frequency is 400 kilocycles per second. Resonant circuit 13 in the anode circuit of device 11 is adjusted to sustain oscillations at the fundamental frequency of the crystal. Between the anode of device 11 and circuit 13, is placed another resonant circuit 14, which is broadly tuned to the frequency modulation broadcast band so that harmonics of the crystal frequency will appear thereacross. Voltage from this circuit is supplied to the frequency converting device 2 through a small coupling capacitor 51, while the output from local oscillator device 5 is coupled to the frequency converting device 2 through a small capacitor 52.

In operation, the crystal oscillator develops harmonic voltages across circuit 14 at every 400 kilocyclts, thus, there are harmonic voltages at 88.0, 88.4, 88.8 megacycles, etc. Suppose now that a frequency modulation carrier wave at 88.1 is tuned in by transformer 3, the local oscillator being simultaneously adjusted to produce an output at 98.8 megacycles. The frequency converter device 2 will then receive voltage at frequencies of 88.1 megacycles from the carrier wave, 88.0 megacycles from the crystal oscillator and 98.8 megacycles from the local oscillator. This will produce intermediate frequency outputs $IF_1$ and $IF_2$ at frequencies of 10.7 and 10.8 megacycles respectively, the former being due to heterodyning of the carrier wave with the local oscillator, and the latter being due to heterodyning of the crystal oscillator harmonic with the local oscillator. Amplifier 10 transmits both intermediate frequencies to the mixer circuit 53 which may be of conventional design to produce a third intermediate frequency $IF_3$ resulting from the difference between $IF_1$ at 10.7 megacycles and $IF_2$ at 10.8 megacycles. $IF_3$ thus occurs at 0.100 megacycle, and the output circuit 31 is tuned to effectively transmit only $IF_3$. The remainder of the circuit is identical to that of Fig. 1 and comprises an amplifier 34 for the third intermediate frequency $IF_3$, a frequency discriminator 35 tuned to 0.1 megacycle or 100 kilocycles, a signal amplifier 36, and a loudspeaker 37.

The circuit behaves in practically identical fashion to that of Fig. 1 and has the same advantages plus, in addition, that of a simplified circuit. This is due to the combination of the two channels for amplifying $IF_1$ and $IF_2$ in Fig. 1 into a single channel for amplifying both frequencies together in Fig. 2.

The receiver of Fig. 2 tunes to carrier waves in the channels of the frequency modulation band by using the beat frequency of the crystal with the local oscillator, alternately above and below the first intermediate frequency for succeeding stations. Thus, as already stated, if a frequency modulation carrier at 88.1 megacycles is tuned in, the second intermediate frequency $IF_2$, will result from the difference in frequency between the local oscillator frequency at 98.8 megacycles and the 88.0 megacycle harmonic of the crystal so that $IF_2$ occurs at 10.8 megacycles. For the next frequency modulation channel at 88.3 megacycles, the local oscillator will be tuned to 99.0 megacycles and will beat with the 88.4 megacycle crystal harmonic so that $IF_2$ occurs at 10.6 megacycles. For the next higher frequency modulation channel at 88.5 megacycles, the local oscillator is tuned to 99.2 megacycles and this will beat with the crystal harmonic at 88.4 megacycles producing $IF_2$ at 10.8 megacycles. Thus, it is seen that the second intermediate frequency $IF_2$ alternates between 10.6 and 10.8 megacycles for succeeding frequency modulation carrier channels throughout the frequency modulation broadcasting band. Amplifier 10 is designed to transmit frequencies over the range extending from 10.6 to 10.8 megacycles, and evidently transmits, in all cases, the first intermediate frequency at 10.7 megacycles.

The third intermediate frequency in this embodiment remains constant in spite of variation and drift in frequency of the local oscillator, because both the first and second intermediate frequencies always drift in the same direction. Consequently, the third intermediate frequency, resulting from their difference, remains constant.

While certain specific embodiments have been shown and described, it will, of course, be understood that various modifications may be made without departing from the invention. To mention only a few possible modifications, a temperature compensated master oscillator could be substituted for the crystal oscillator. Or again, a pair of crystal oscillators may be employed instead of the single crystal oscillator which has been shown. One of these crystal oscillators could be used to generate a single frequency at the lower end of the frequency modulation broadcast band and the second crystal could be used to generate harmonics at frequencies equal to the frequency modulation channel spacing, which would be added by frequency conversion to the output of the first crystal oscillator. The appended claims are, therefore, intended to cover any such modifications within the true spirit and scope of the invention.

What I claim as new and desire to secure by Letters Patent of the United States is:

1. A system for selectively receiving carrier waves occurring at evenly spaced frequency intervals over a band, comprising means for selecting one of said carriers, means comprising a first tunable local oscillator for generating any desired frequency within a corresponding band displaced in frequency from said first band, means to produce a first intermediate frequency resulting from the difference in frequency between said carrier and said oscillator, means comprising a second local oscillator for generating a fixed frequency equal to an integral multiple, including unity, of said frequency interval and for simultaneously generating harmonics thereof, means for selecting a particular one of said harmonics, means for producing a second intermediate frequency resulting from the difference in frequencies between said first local oscillator and said selected harmonic, means to translate both said intermediate frequencies through a common signal channel, means connected to the output of said channel to produce a third intermediate frequency resulting from the difference in frequency between said first and second intermediate frequencies, and means for demodulating said third intermediate frequency.

2. A system for selectively receiving one of a number of carrier waves occurring at evenly spaced frequency intervals over a band, comprising an adjustable tuned circuit having a resonant frequency for selecting one of said carriers, means comprising a variable frequency local oscillator for producing an output at a constant difference in frequency from said resonant frequency, means comprising a frequency converter for producing a first intermediate frequency resulting from the difference in frequency between said carrier and said local oscillator output, means comprising a crystal oscillator operating at a constant fundamental frequency equal to an integral multiple, including unity, of said frequency interval for generating a plurality of harmonics which are higher multiples of said intervals, means for selecting a particular one of said harmonics, means for producing a second intermediate frequency resulting from the difference in frequencies between said local oscillator, said selected harmonic means to translate both said intermediate frequencies through a common signal channel, means connected to the output of said channel to produce a third intermediate frequency resulting from the difference in frequency between said first and second intermediate frequencies, and means for demodulating said third intermediate frequency.

3. A system for selectively receiving one of a number of carrier waves occurring at evenly spaced frequency intervals over a band, comprising an adjustable tuned circuit having a resonant frequency for selecting one of said carriers, means comprising a variable frequency local oscillator for producing an output at a constant difference in frequency from said resonant frequency, a crystal oscillator operating at a fundamental frequency equal to twice said frequency interval and also generating higher harmonics of the order of frequencies in said carrier frequency band, means comprising a frequency converter for producing a complex intermediate frequency wave containing a first frequency component resulting from the difference in frequency between said local oscillator output and said carrier and a second frequency component resulting from the difference in frequency between said local oscillator output and at least one of said harmonics, means to amplify said complex intermediate frequency wave, means comprising a mixer for producing a wave of another intermediate frequency resulting from the difference in frequency between said two components, and means for demodulating said other intermediate frequency wave.

4. A system for receiving one of a number of carrier waves occurring at frequency intervals P over a band of frequencies, comprising a tuned circuit having a resonant frequency for selecting one of said carriers at a frequency CW, means comprising a variable frequency local oscillator for producing an output at a frequency LO, said output having a relatively constant difference in frequency from said resonant frequency, means comprising a first frequency converter for producing a first intermediate frequency $$IF_1=LO-CW$$

means comprising a crystal oscillator for producing a plurality of harmonic frequencies equal to integral multiples of said intervals P, one of said harmonics having a frequency XL of the same order of magnitude as frequencies in said carrier frequency band, means comprising another frequency converter for producing a second intermediate frequency $IF_2=LO-XL$, means to translate said first and second intermediate frequencies through a common amplifying channel, means comprising a further frequency converter for producing a third intermediate frequency $IF_3=IF_2-IF_1$ whereby $IF_3=CW-XL$ and is independent of the exact frequency LO of the output of said local oscillator, and means for demodulating said third intermediate frequency.

ROBERT B. DOME.

References Cited in the file of this patent

UNITED STATES PATENTS

| Number | Name | Date |
|---|---|---|
| 2,024,614 | Terry | Dec. 17, 1935 |
| 2,129,020 | Murphy | Sept. 6, 1938 |
| 2,186,980 | Lowell | Jan. 16, 1940 |
| 2,228,815 | Deerhake | Jan. 14, 1941 |
| 2,405,765 | Smith | Aug. 13, 1946 |
| 2,509,963 | Collins | May 30, 1950 |

OTHER REFERENCES

The Collins Drift Cancelled Oscillator, Electronics, March 1947, page 209.